(12) United States Patent
Ham

(10) Patent No.: US 7,059,655 B2
(45) Date of Patent: *Jun. 13, 2006

(54) VERTICAL DOOR CONVERSION KIT

(75) Inventor: Demetrius Calvin Ham, East Orange, NJ (US)

(73) Assignee: Decah, LLC, Livingston, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/722,235

(22) Filed: Nov. 24, 2003

(65) Prior Publication Data

US 2005/0022342 A1    Feb. 3, 2005

Related U.S. Application Data

(62) Division of application No. 10/305,522, filed on Nov. 26, 2002, now Pat. No. 6,845,547.

(51) Int. Cl.
*B60J 5/04*    (2006.01)

(52) U.S. Cl. ............... 296/146.12; 296/146.11; 296/202

(58) Field of Classification Search ............. 296/146.1, 296/146.9, 146.11, 146.12, 146.13, 202
See application file for complete search history.

(56) References Cited

U.S. PATENT DOCUMENTS

| | | | |
|---|---|---|---|
| 2,178,908 A * | 11/1939 | Hudson | 16/367 |
| D150,161 S | 7/1948 | Sanmori | |
| 2,775,478 A | 12/1956 | Stimetz | |
| 2,777,728 A | 1/1957 | Barenyi | |
| 3,589,069 A * | 6/1971 | Lecomte | 49/257 |
| 3,594,853 A | 7/1971 | Slattery | |
| 3,628,216 A * | 12/1971 | Savell | 16/287 |
| 3,870,361 A | 3/1975 | Krause | |
| 4,238,876 A | 12/1980 | Monroe et al. | |
| 4,684,167 A | 8/1987 | Newmayer | |
| 4,692,964 A | 9/1987 | DeBruyn | |
| 4,719,665 A | 1/1988 | Bell | |
| 4,776,626 A | 10/1988 | Seyler | |
| 4,801,172 A | 1/1989 | Townsend | |
| 5,013,082 A | 5/1991 | Landmesser | |
| 5,035,463 A | 7/1991 | Kato et al. | |
| 5,074,609 A | 12/1991 | Dear | |
| 5,242,208 A | 9/1993 | Ohya | |
| 5,261,720 A | 11/1993 | Lomax, Jr. et al. | |
| 5,265,311 A | 11/1993 | Gard | |
| 5,600,868 A | 2/1997 | Tourville et al. | |
| 5,918,347 A | 7/1999 | Morawetz | |
| 5,921,611 A | 7/1999 | Townsend | |
| 5,992,918 A | 11/1999 | Gobart et al. | |
| 6,000,747 A | 12/1999 | Sehgal et al. | |
| 6,036,256 A | 3/2000 | Hilliard et al. | |
| 6,086,137 A * | 7/2000 | Leschke et al. | 296/146.1 |
| 6,175,991 B1 | 1/2001 | Driesman et al. | |

(Continued)

FOREIGN PATENT DOCUMENTS

DE    3423037    1/1986

(Continued)

*Primary Examiner*—Patricia L. Engle
(74) *Attorney, Agent, or Firm*—Carella, Byrne, et al.; Frank J. Chesky, III; William Squire

(57) ABSTRACT

The invention provides a method of opening a vehicle door in a doorway of a vehicle body, the method comprising: rotating such vehicle door in a horizontal plane of motion until such vehicle door substantially clears such vehicle body; and then rotating such vehicle door in a vertical plane of motion until such vehicle door substantially clears such doorway. The invention may be easily retrofitted to existing vehicles or factory installed.

26 Claims, 13 Drawing Sheets

U.S. PATENT DOCUMENTS

| | | |
|---|---|---|
| 6,178,593 B1 | 1/2001 | Carlson |
| 6,447,043 B1 | 9/2002 | Vanden Heuvel et al. |
| 6,629,337 B1 | 10/2003 | Nania |
| 6,676,193 B1 * | 1/2004 | Hanagan ................ 296/146.11 |
| 6,808,223 B1 * | 10/2004 | Baum et al. ........... 296/146.12 |
| 6,820,918 B1 * | 11/2004 | DeBono ................ 296/146.11 |
| 6,845,547 B1 * | 1/2005 | Ham ........................... 16/374 |
| 2004/0256882 A1 * | 12/2004 | McRobert .............. 296/146.11 |

FOREIGN PATENT DOCUMENTS

| | | |
|---|---|---|
| DE | 3539276 | 2/1987 |
| DE | 42 06 288 A1 | 9/1993 |
| DE | 4319662 A1 | 12/1994 |
| EP | 0 493 225 A1 | 7/1992 |
| FR | 2 694 244 A1 | 2/1994 |

* cited by examiner

VERTICAL DOOR CONVERSION KIT

CROSS REFERENCE TO RELATED APPLICATION

This application is a division of application Ser. No. 10/305,522, now U.S. Pat. No. 6,845,547, filed in the United States Patent and Trademark Office on Nov. 26$^{th}$, 2002, with the title VERTICAL DOOR CONVERSION KIT in the name of the same inventor, Demetrius C. Ham, for which the entire disclosure is incorporated by reference.

FIELD OF THE INVENTION

This invention relates generally to vehicle doors and specifically to door hinge mechanisms allowing vehicle doors to rotate upward from the vehicle when opened.

BACKGROUND OF THE INVENTION

Conventional door hinges on automobiles have a number of problems. As is well known, such conventional systems hinge the door at the front of the edge and swing the door outwards through a horizontal arc which brings the rear edge of the door quite distant from the vehicle body. A spring action which assists in the opening of the door attempts to push the door open to substantially the full distance it is capable of opening. Opening the door in this fashion results in either the door's rear edge hitting whatever the vehicle is stopped next to or else requires the user to "fight" the door continuously as they get out of the vehicle, to prevent the door from reaching the full extension outwards. Since vehicles quite often end up parked next to either another vehicle or an abrasive concrete surface, allowing the door to swing out and impact the object next to the vehicle is distinctly undesirable.

Even when the user is not forced to limit the door's motion to a safe degree (for example, when the vehicle is parallel parked or parked next to an empty parking spot), the door itself is usually partially in the way of the user. Typically, the door opens somewhat less than 90 degrees and has a substantial width and a fair number of projections such as interior door handles, knobs, window controls, etc. The result is that around one half of the available arc beside the vehicle is covered by the door, making entry and egress a bit more difficult. Occasionally, a user may be blocked from even reaching the vehicle's entryway by the body of the door, for example, when the door is already open and the user approaches the vehicle from the front. Either the door must be partially or wholly closed to allow the user to squeeze past, then reopened to allow entry, or the user must walk around the vehicle the other direction.

Given the omnipresence of traffic, such diversions from simple entry are dangerous to users, and when a vehicle is parallel parked, a projecting door on the driver's side of the vehicle becomes an obstacle and danger to traffic. The projecting door itself is also in danger of being struck and damaged by passing traffic.

One possible solution to the horizontally hinged door is the vertically hinged door. Certain expensive types of automobiles have frames custom designed to support vertically hinged doors. Such doors are hinged to swing straight upwards at opening, in an arc in one dimension. However, it is normally necessary to implement such doors at the time the vehicle frame is designed, so as to allow for a frame which does not impede the top of door when it moves vertically.

U.S. Pat. No. 2,777,728 issued Jan. 15, 1957 to Barenyi for MOTOR VEHICLE ACCESSIBLE BY MEANS OF A PIVOTAL CAP teaches a one dimensional hinge in which the entire cab of the vehicle rotates in one plane of motion.

U.S. Pat. No. 3,870,361 issued Mar. 11, 1975 to Krause for HINGED SYSTEM FOR AUTOMOBILE DOORS WITH HINGE HALVES WELDED TO BODY AND DOOR teaches a one dimensional hinge in which the vehicle door rotates in one plane of motion. This patent also teaches an eccentric bushing allowing adjustment of the door hinge to achieve a tight fit; details of the structure of the bushing are different from the present invention.

U.S. Pat. No. 4,238,876 issued Dec. 16, 1980 to Monroe et al for METHOD FOR CONVERTING HARD TOP VEHICLES TO REMOVABLE TOP VEHICLES teaches non-analogous devices for sealing a vehicle roof to a car body. No hinges are discussed. U.S. Pat. No. 4,684,167 issued Aug. 4, 1987 to Newmayer for ROOF HINGED DOOR APPARATUS teaches a one dimensional hinge allowing rotation of a vehicle door in one plane of motion. The hinge is located at the top of the door, not the front, and the form of rotation would necessarily involve a large and undesirable swing outwards away from the vehicle body, making opening the door impossible when parked close to another vehicle or other obstruction.

U.S. Pat. No. 5,013,082 issued May 7, 1991 to Landmesser for DOOR HINGING SYSTEM teaches a vertically opening door which moves in a single plane of motion on a substantial support arm located somewhere on the auto body.

U.S. Pat. No. 5,242,208 issued Sep. 7, 1993 to Ohya for STRUCTURE OF A BODY OF AN AUTOMOTIVE VEHICLE teaches not one but two single plane hinges which move a portion of the car door in a single plane vertically upwards and a second portion of the car door in a second single plane in the normal fashion.

U.S. Pat. No. 5,261,720 issued Nov. 16, 1993 to Lomax, Jr. et al for VERTICALLY MOVING CAR DOOR teaches a rear hatch which slides upwards in a single plane of motion, on rails.

U.S. Pat. No. 5,921,611 issued Jul. 13, 1999 to Townsend for UPWARDLY RETRACTING VEHICLE DOOR also teaches a rear hatch which rotates upwards in a single plane of motion, on rails.

U.S. Pat. No. 5,992,918 issued Nov. 20, 1999 to Gobart et al for BI-FOLD GULL WING VEHICLE DOOR teaches a design in which the vehicle door only rotates in one plane but actually folds up in the middle, that is, it has two sets of hinges, one set at the top of the door and one set in the middle of the door itself to provide the fold.

U.S. Pat. No. 6,036,256 issued Mar. 14, 2000 to Hilliard et al for WINDOW ASSEMBLY FOR A MOTOR VEHICLE teaches a window frame into which the window is removably mounted. It appears to be non-analogous.

Essentially one dimensional door motions will normally have one problem or another as previously discussed. The applicant is unaware of any door hinges offering true two dimensional motion, so as to allow the door to open vertically after a brief horizontal motion.

SUMMARY OF THE INVENTION

General Summary

The present invention provides a door hinge mechanism imparting a two dimensional motion to the door as it opens or closes. In addition, the present mechanism provides for a motion in two different directions at two different portions of the door's motion cycle. The present invention provides a hinge which allows the door of the vehicle to move outwards in a substantially horizontal plane for a predetermined arc, then move vertically upwards thereafter, again for a predetermined arc. By this means, the vehicle frame need not be specially adapted to a door having vertical motion. At the same time, the limited horizontal motion allows a great degree of mitigation of the problems associated with horizontal-only door arcs. Thereafter, the vertical motion is unimpeded by the vehicle frame (being already somewhat distanced from the vehicle) and so a substantial vertical arc upwards may be completed, allowing the user easy entry and exit from the vehicle.

The present invention comprises a hinge and/or a bearing mechanism having a chassis mounting plate and a swingarm. Between them is either a pivotal bearing or a hinge designed to allow the staged two dimensional motion of the invention. A spring or cylinder is connected at its ends to the chassis mounting plate and the swingarm. A horizontal pressure bearing surface and a cam adjuster cooperate to provide strength and precise fit of the door with the vehicle. The present invention may be used with all types of vehicles including automobiles, trucks, vans, buses, agricultural equipment, aerial vehicles, boats and other types of vehicles having enclosed compartments.

Summary in Reference to the Claims

It is therefore one aspect, advantage, objective and embodiment of the invention to provide a vehicle door hinge for a vehicle door and frame, the hinge comprising: a chassis mounting plate securely fastened to such vehicle frame; a swingarm securely fastened to such vehicle door; a bi-directional rotation mechanism allowing motion of the door in a first horizontal plane and a second vertical plane.

It is therefore one aspect, advantage, objective and embodiment of the invention to provide a hinge, wherein motion of the door in the first horizontal plane and motion of the door in the second vertical plane occurs sequentially.

It is therefore one aspect, advantage, objective and embodiment of the invention to provide a hinge, wherein the bi-directional rotation mechanism further comprises one member selected from the group consisting of: a bi-directional hinge, a spherical bearing, and combinations thereof.

It is therefore one aspect, advantage, objective and embodiment of the invention to provide a hinge, wherein: the swingarm further comprises a horizontal bearing surface; the chassis mounting plate further comprises a strong bearing surface having a length; the horizontal bearing surface and the strong bearing surface being located so that the horizontal surface rotates along the length of the strong bearing surface during motion of the door in the first horizontal plane; whereby the strong bearing surface and the horizontal bearing surface cooperate together to take the stress of the door opening.

It is therefore one aspect, advantage, objective and embodiment of the invention to provide a hinge, wherein the strong bearing surface further comprises a cam adjuster having a barrel with an off-center axis of rotation and a post, the barrel being able to rotate about the post.

It is therefore one aspect, advantage, objective and embodiment of the invention to provide a hinge, wherein the cam adjuster further comprises a set screw having a first position in which rotation of the barrel about the post is enabled and a second position in which rotation about the post is prevented.

It is therefore one aspect, advantage, objective and embodiment of the invention to provide a hinge, wherein the bi-directional rotation mechanism further comprises: a bi-directional hinge; at least one hinge support; a hinge pin passing through the bi-directional hinge and hinge support; whereby the horizontal rotation in the first plane is enabled.

It is therefore one aspect, advantage, objective and embodiment of the invention to provide a hinge, wherein the bi-directional rotation mechanism further comprises: a bi-directional hinge having a first position corresponding to such door being closed, a second position corresponding to such door having opened through the horizontal plane, a vertical shaft having at least one steel ball disposed within, and a groove; the groove being located beneath the vertical shaft when the bi-directional hinge is in the first position, the ball sitting partially in the groove and blocking rotation of the bi-directional hinge when the bi-directional hinge is in the first position, the ball being forced out of the groove when the bi-directional hinge is in the second position thereby enabling rotation of the bi-directional hinge in the vertical plane.

It is therefore one aspect, advantage, objective and embodiment of the invention to provide a hinge further comprising: an externally threaded locking pin; and wherein an internally threaded sleeve connects to the swingarm, the locking pin engaged with the sleeve; the bi-directional rotation device having a first position corresponding to such door being closed and a second position corresponding to such door having opened through the horizontal plane, the hinge support being dimensioned and configured such that when the bi-directional rotation device is in the first position the locking pin may not enter the hinge support, whereby the internally threaded sleeve prevents rotation in the vertical plane.

It is therefore one aspect, advantage, objective and embodiment of the invention to provide a hinge, wherein the motion of the door in the second vertical plane is prevented when the door has not fully completed motion in the first horizontal plane, and further wherein the motion of the door is the first horizontal plane is prevented when the door has not fully completed motion in the second vertical plane.

It is therefore one aspect, advantage, objective and embodiment of the invention to provide a hinge, further comprising: a sag adjuster screw guide mechanism rotationally connected in the first horizontal plane to the bi-directional rotation mechanism; and a sag adjuster screw bearing against the sag adjuster screw guide when the vehicle door is rotated through the first horizontal plane.

It is therefore one aspect, advantage, objective and embodiment of the invention to provide a method of opening a vehicle door in a doorway of a vehicle body, the method comprising: rotating such vehicle door in a horizontal plane of motion until such vehicle door substantially clears such vehicle body; and then rotating such vehicle door in a vertical plane of motion until such vehicle door substantially clears such door way.

It is therefore one aspect, advantage, objective and embodiment of the invention to provide a method, further comprising: providing a chassis mounting plate securely fastened to such vehicle frame; providing a swingarm securely fastened to such vehicle door; providing a bi-directional rotation mechanism allowing motion of the door in a first horizontal plane and a second vertical plane.

It is therefore one aspect, advantage, objective and embodiment of the invention to provide a method, wherein the bi-directional rotation mechanism prevents the motion of the door in the second vertical plane when the door has not fully completed motion in the first horizontal plane.

It is therefore one aspect, advantage, objective and embodiment of the invention to provide a method of retrofitting a vehicle door hinge connecting a vehicle door to a vehicle frame, comprising the steps of: removing the vehicle door hinge, fastening a chassis mounting plate securely to such vehicle frame; fastening a swingarm securely to such vehicle door; installing a bi-directional rotation mechanism connecting the chassis mounting plate and the swingarm, the bi-directional rotation mechanism allowing motion of the door in a first horizontal plane and a second vertical plane.

It is therefore one aspect, advantage, objective and embodiment of the invention to provide a method wherein the bi-directional rotation mechanism prevents the motion of the door in the second vertical plane when the door has not fully completed motion in the first horizontal plane.

It is therefore one aspect, advantage, objective and embodiment of the invention to provide a method wherein the bi-directional rotation mechanism further comprises: at least one sag adjustment device preventing vertical sag of the door during the first horizontal plane of motion.

BRIEF DESCRIPTION OF THE DRAWINGS

FIG. 4 shows a second embodiment of the invention at rest.

FIG. 5 shows the second embodiment of the invention at rest, with the door properly adjusted.

FIG. 7 shows a third embodiment of the invention at rest.

FIG. 8 shows the third embodiment of the invention at rest, with the door properly adjusted.

FIG. 10 shows a fourth embodiment of the invention at rest.

FIG. 11 shows the fourth embodiment of the invention at rest, with the door properly adjusted.

FIG. 12 shows a fifth embodiment of the invention at rest.

FIG. 13 shows the fifth embodiment of the invention at rest, with the door properly adjusted.

DETAILED DESCRIPTION

The present invention teaches several bi-directional rotation mechanisms: various types of hinges which allow rotation in more than one plane of motion. In general, the following embodiments of the bi-directional rotation mechanism have at least three distinctive positions: a first position corresponding to the door being closed, a second position corresponding to the door having opened through the horizontal plane, and a third position corresponding to the door having opened upwards from the second position through the vertical plane. One feature of the present invention is the ability in embodiments to allow substantially horizontal motion in a first horizontal arc or plane, followed by substantially vertical motion in a second vertical plane or arc, for opening the door. For closing, this sequence is reversed. The substantially horizontal motion is motion which allows the vehicle door to clear the vehicle frame, even on vehicles having frames NOT specifically designed for vertically opened doors. During this phase of opening, the distance from door to vehicle is increased. Later, the substantially vertical motion allows the door to move vertically without significantly increasing the distance from the vehicle to the door.

A second type of motion restriction involves adjustment of the door to fit properly with the frame. The door may "whistle" or wear excessively or suffer numerous other problems if it does not properly fit the vehicle frame. In particular "sag adjustment" during the horizontal motions or while the door is closed is of particular importance: negative vertical motion during this phase may be prevented by means of sturdy sag prevention mechanisms. Note, however, that this prevention may be separated conceptually from the issue of overall door motion during opening and closing.

Figure 1:
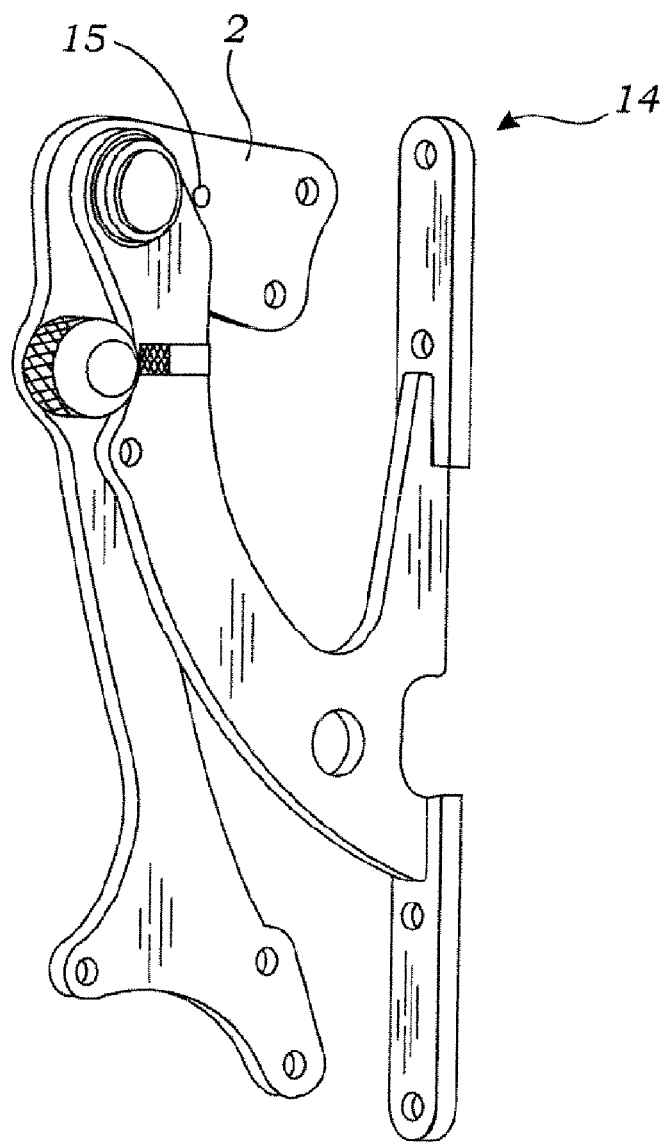
FIG. 1 is a perspective view of the present invention in the closed position.
Figure 3:
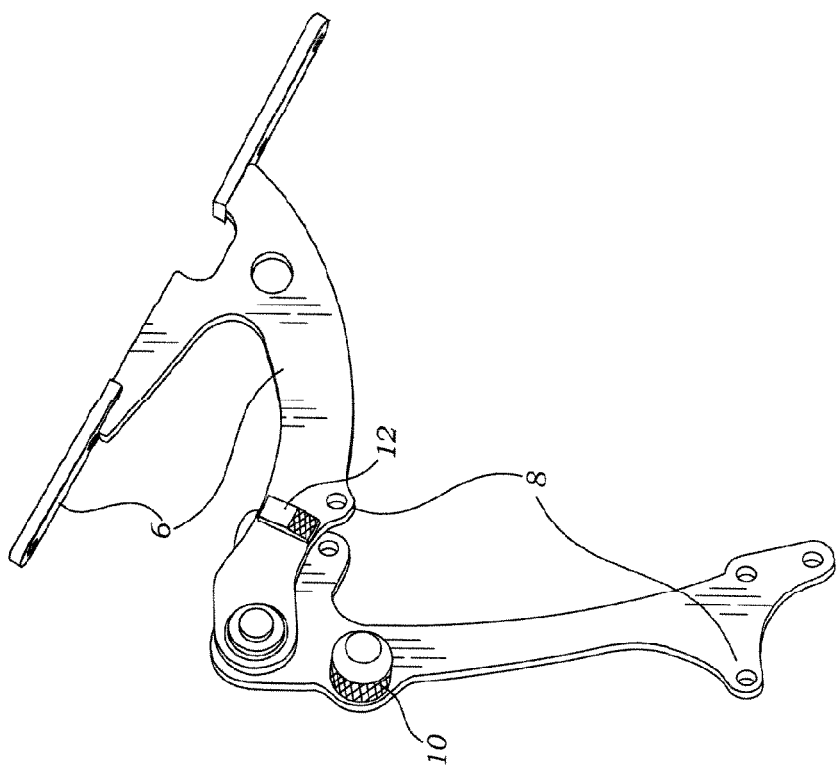
FIG. 3 is a perspective view of the present invention after full or partial extension.
Figure 2:
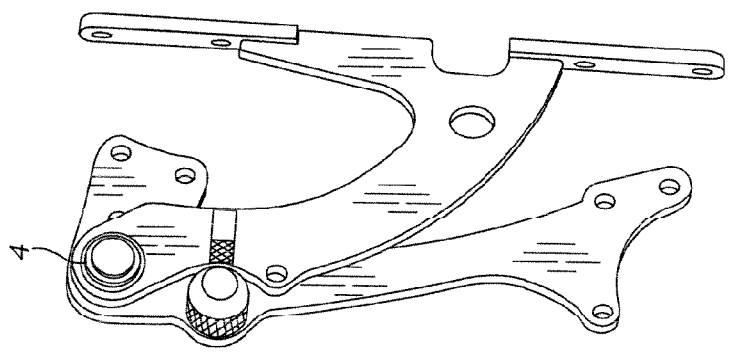
FIG. 2 is a perspective view of the present invention after the initial swing out in the horizontal plane.

FIGS. 1, 2 and 3 depict a first embodiment of the present invention in various positions. The vehicle door hinge system of the present embodiment comprises: chassis mounting plate 2, bearing 4, swingarm 6, spring mounting holes 8, cam adjuster 10, horizontal bearing surface 12 and door mounting holes 14.

FIG. 1 is a perspective view of the present invention in the closed position. In the closed position, chassis mounting plate 2 is securely fastened/attached to the frame of the vehicle by fasteners (not shown). Swingarm 6 is securely fastened/attached to the vehicle door by fasteners (not shown) passed through door mounting holes 14. Note that while the presently preferred embodiment and best mode now contemplated for carrying out the invention uses fasteners such as bolts, and door mounting holes 14 are bolt holes, in alternative embodiments of the invention other fastening structures and means may be used. For example, screws, rivets, welding, bonding and other types of fastening may be used without departing from the scope of the present invention. In the closed position, a tight and correct fit with correct orientation and no unusual spacing between the door and the door frame is vital: without a tight fit, the vehicle becomes noisy and drafty. In order to provide such a tight fit, it is desirable to embody the invention in high strength materials capable of maintaining a close tolerance over thousands of cycles of use. Examples of such materials include high quality metals, alloys, modem composite materials, and other materials displaying an ability to resist long term deformation under the conditions of usage. Selection and engineering of such materials will not require undue experimentation to those skilled in the art.

Further in aid of maintaining a tight fit of the door to the frame, cam adjuster 10 and horizontal bearing surface 12 together operate as a cam during the first phase of the door opening cycle. Cam adjuster 10 may advantageously be, and in the presently preferred embodiment and best mode now contemplated for carrying out the invention is, a barrel with an off-center axis of rotation i.e. which rotates freely around an off-centered post. The off-centered axis of rotation of the barrel is important to the invention for adjustment and ensuring a proper fit. The off-centered barrel rotates around the post and thus in effect presents a longer distance from the axis of rotation to the bearing surface against the barrels's surface: the barrel's increasing or decreasing radius (distance from the axis to the surface) means that the barrel functions both as a bearing and also as a cam, simultaneously. The barrel is only rotated during adjustments, not during door opening and closing. This off-centered axis of rotation assists in the very important areas of maintaining a tight and correct fit and in maintaining the proper orientation as the door opens, and further provides a strong bearing surface having a length. In other embodiments of the invention it may be a plain bearing surface or post, though the adjustability offered by an offset axis of rotation is preferable.

Cam adjuster 10 provides an adjustable distance between swingarm 6 and chassis mounting plate 2. Cam adjuster 10 may be adjusted in position on chassis mounting plate 2, by means of set screws or other structures (not shown). Adjusting cam adjuster 10 allows adjustment of the vertical and horizontal placement of the door when the door is in the closed position, and further during the initial swing out operation of the door opening cycle. In the closed position depicted, cam adjuster 10 and horizontal bearing surface 12 rest against each other, while chassis mounting plate 2 and swingarm 6 are maintained at a relative angle to each other of approximately zero, that is, they are nearly parallel as they sit in repose, until they are adjusted. Note that stopping pin 15 prevents vertical motion on the part of swingarm 6 prior to the time when the horizontal motion of swingarm 6 and the door are sufficiently opened. In addition, stopping pin 15 holds swingarm 6 at the proper angle when the door is open.

At the time that a user opens the door of the vehicle, the door first rotates in a horizontal plane. This motion introduces an angle between chassis mounting plate 2 and swingarm 6. This rotation does NOT take cam adjuster 10 out of contact with horizontal bearing surface 12, on the contrary the strong bearing surface of cam adjuster 10 and horizontal bearing surface 12 cooperate together to take the stress of the door opening, and to maintain the door in proper alignment with the door frame, as horizontal bearing surface 12 rotates or rolls along the length of cam adjuster 10.

In FIG. 1, this motion may be visualized as swingarm 6 rotating out of the plane of the diagram towards the viewer while chassis mounting plate 2 does not move. The result of the arc of motion of swingarm 6 is FIG. 2.

FIG. 2 is a perspective view of the present invention after the initial swing out in the horizontal plane. In FIG. 2, chassis mounting plate 2 has not moved from FIG. 1, while swingarm 6 has rotated out of the plane of the paper, causing an apparent foreshortening of swingarm 6 due to perspective.

As stated previously, this motion and the associated flexure occur at two locations in the bi-directional rotation mechanism: bearing 4 being one location and cam adjuster 10 (over which horizontal bearing surface 12 is rotating, lengthwise rather than radially) being the other location. By providing two places at which this motion occurs, the present invention drastically reduces the torque generated by the angular momentum of the door as its mass is rotated. This is accomplished by providing the distance between bearing 4 and cam adjuster 10, which distance may be altered (for example by placing cam adjuster 10 further away from bearing 4) in other embodiments of the present invention. This reduction in torque in turn provides greater useful life for the components of the invention and furthermore subjects the components of the invention to reduced forces, thus reducing the possibility of warping over thousands of cycles of use, thus providing a tight fit between door and frame on a continuing basis.

In the best mode presently contemplated, the arc of motion of swingarm 6 and the vehicular door to which it is attached is in the range 2 to 45 degrees. The degree of horizontal rotational motion may be selected to allow the door to clear all parts of the vehicle body during the opening cycle, this will be referred to as "substantially" clearing the vehicle body.

After the first phase of motion is completed, the door may swing through a second vertical plane/arc as shown in FIG. 3. FIG. 3 is a perspective view of the present invention after full or partial extension. Bearing 4 now enables swingarm 6 to rotate in a new direction. Dimensionally, the new direction of rotation need not be exactly orthogonal to the direction of motion during the first phase, that is, the new motion is substantially vertical in the preferred embodiment but in other embodiments the direction of rotation may considerably depart from the vertical. The motion occurs sequentially in this embodiment and certain other embodiments: the motion of the door in first horizontal plane and motion of the door in the second vertical plane occur one after the other, rather than at the same time.

During this rotation, cam adjuster 10 and horizontal bearing surface 12 are removed from one another by the rotation of swingarm 6. The door, however, now swings upwards out of the way of the user, allowing easy entry and exit from the vehicle, this will be referred to as "substantially clearing the door way" of the vehicle. The phrase fully completed motion in the first horizontal plane includes, for purposes of this application, the fact that the door must move outward from the vehicle body horizontally by a distance sufficient to avoid damage to the vehicle frame/body during the vertical motion.

Spring mounting holes 8 are used to hold a spring of various types. In general, the spring is designed to function as a counter balance to the weight of the door, thus allowing much easier door motion up or down. Ideally, the spring used may almost exactly balance the mass of the door, thus drastically reducing the difficulty of swinging the door upwards. The spring used may be a conventional spring such as a coil spring, or it may be a gas strut, a combination device or other types of gas or metal spring, without departing from the scope of the present invention. The spring may also be a hydraulic cylinder actuated by a master cylinder located elsewhere in the vehicle, however, this option makes the desirable retrofitting embodiment of the invention less easy to accomplish. The spring may be fastened at both ends to spring mounting holes 8, as in the favored embodiment, or other securing structures and means may be used within the scope of the invention.

While in the embodiments depicted, the degree of horizontal motion (for example, 25 degrees) is determined only by the geometry of the hinge/bearing, the swingarm and the chassis mounting plate, in alternative embodiments the user may adjust the invention to set the degree of horizontal arc. In yet other embodiments, the user may adjust the mechanism to set the degree of vertical arc.

Figure 4:
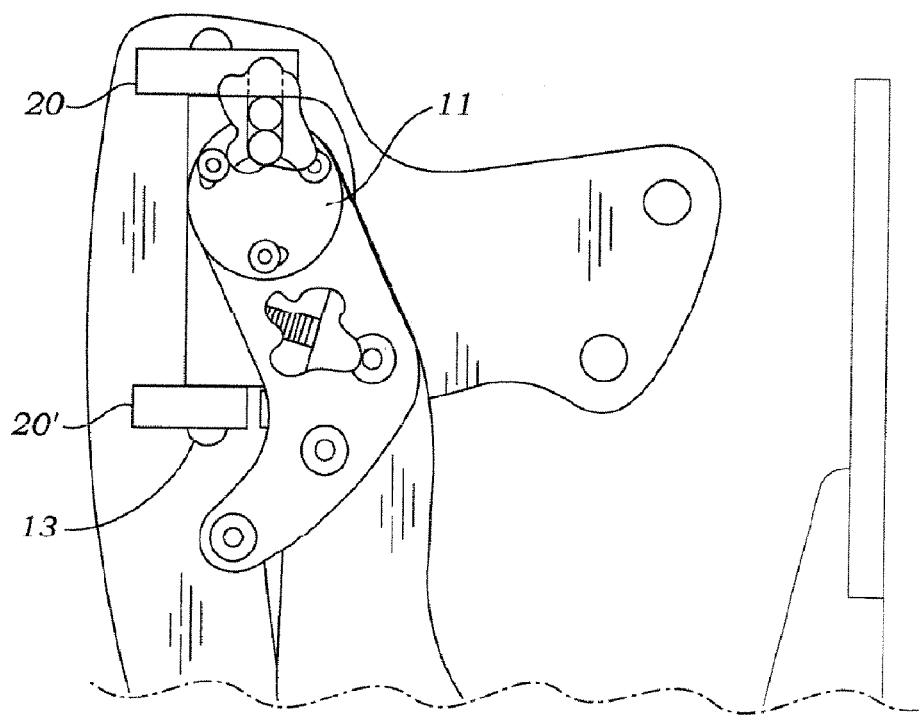
FIG. 4 is a side view with two partial cut-aways.
Figure 5:
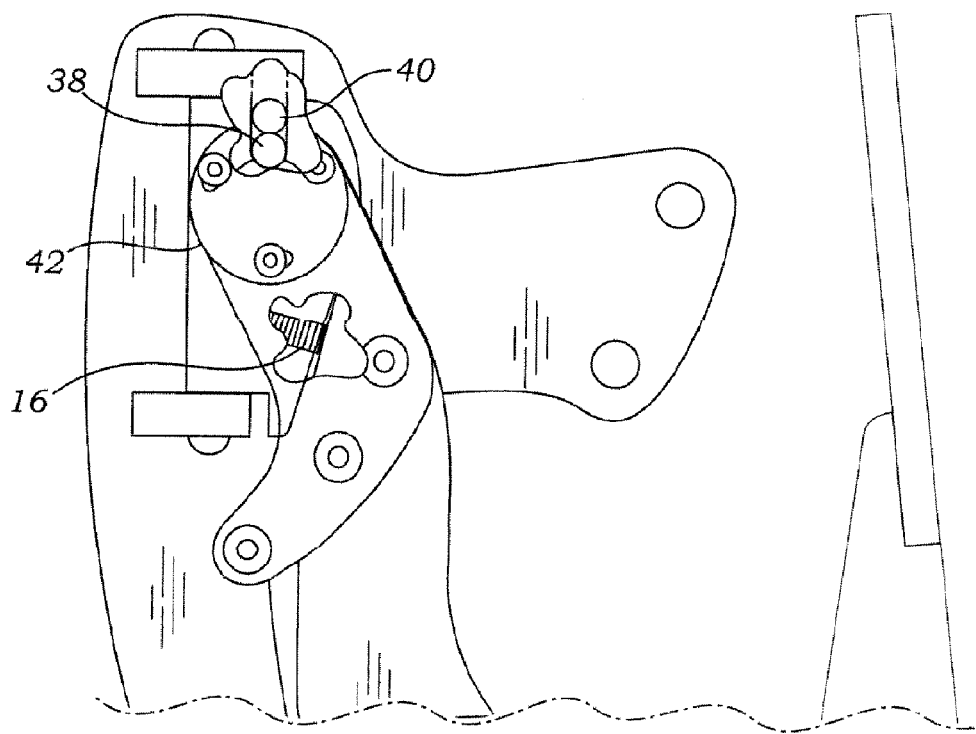
FIG. 5 is a side view with two partial cut-aways.

FIG. 4 is a side view with two partial cut-aways; FIG. 4 shows a second embodiment of the invention at rest. Bidirectional hinge 11 not only supports horizontal and vertical arc motions, it also serves as the housing for the horizontal and vertical arc stops and lock mechanisms. Hinge supports 20 and 20' support the vehicle door and have hinge pin 13 there through. Hinge pin 13 runs through bidirectional hinge 11. Horizontal motion of the door is accomplished by hinge pin 13, which functions much like the hinge pin of an ordinary residential door. Horizontal motion (out of the plane of FIGS. 4, 5 and 6) is thus enabled without complex devices. FIG. 5 is a side view with two partial cut-aways; FIG. 5 shows the second embodiment of the invention at rest, with the door properly adjusted. Adjustment is achieved using door alignment adjuster screw 16 (visible in the lower cut-away area. By altering the setting of adjuster screw 16, the proper fit of the door may be achieved. Careful examination of FIG. 5 will show that in comparison to FIG. 4, the swingarm is being held slightly open as a result of the proper fit of the door being found. This same view may also be achieved during certain stages of the horizontal arc as the door begins the horizontal portion of the opening cycle: such motion is largely "out of plane" of FIG. 5 and thus difficult to sense in comparing FIG. 4 and FIG. 5.

Figure 6:
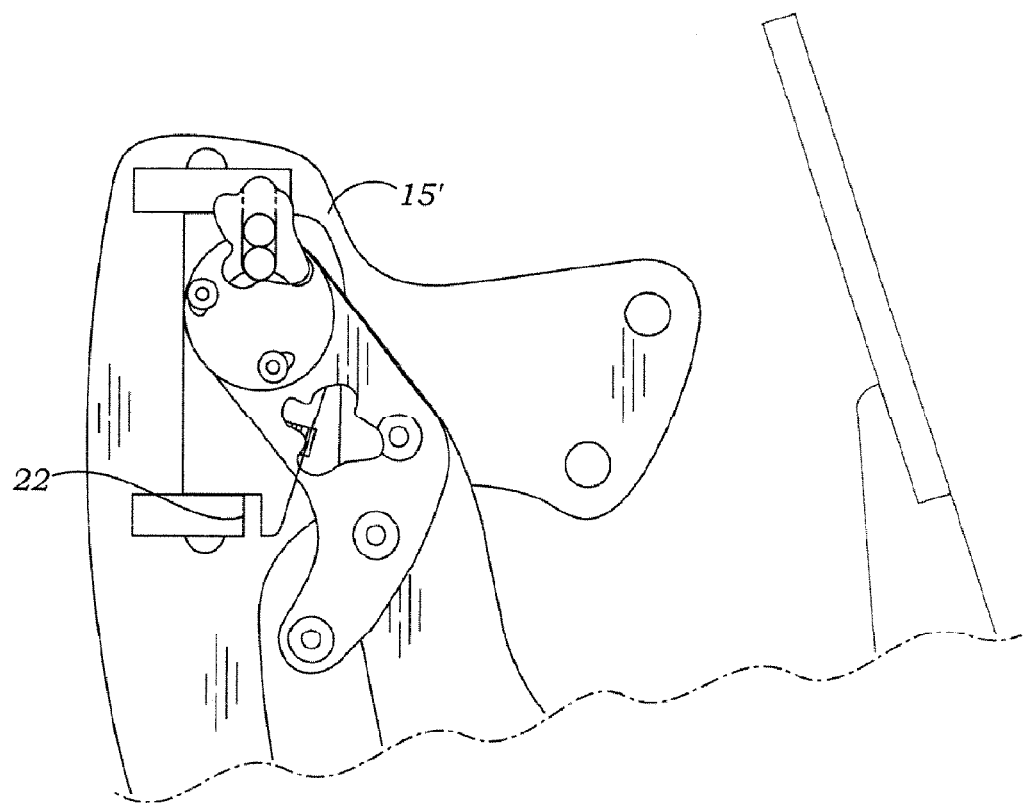
FIG. 6 is a side view with two partial cut-aways, showing the swingarm as it begins its vertical arc motion.

FIG. 6 is a side view with two partial cut-aways, showing the swingarm as it begins its vertical arc motion. The vertical motion is a counter clock-wise rotation of the swingarm as sensed by viewing of FIG. 6: the motion is visible even though the vertical arc is only beginning. Vertical arc stop 22 prevents excessive motion during motion of the door in the vertical plane.

It is worth noting that in all embodiments in which the invention is installed on both sides of the vehicle, the embodiment becomes a mirror image of the diagrams shown in this application.

Flat area 15' bears against the swingarm 6' to stabilize the door's motion and provide an additional bearing and alignment surface corresponding to the stopping pin discussed in reference to the first embodiment of the invention. Note that the dimensions and configuration of the swingarm 6' as they bear against flat area 15' may also be used to adjust the fit of the door in the frame.

In this embodiment, control over the timing of vertical and horizontal swinging motions is accomplished by bidirectional hinge 11, which has a ball and groove internal arrangement shown in the upper cut-away view. One or more steel balls 38 sit in a shaft with their weight resting in a groove 39 inside of hinge 11. After the hinge 11 rotates and follows the swingarm 6' through the horizontal arc of its motion, at the beginning of the vertical arc of motion, the balls 38 are forced up out of the groove 39 and up into recess 40 of support 20. This frees the swingarm 6' for the vertical arc to begin. By this device, the horizontal and vertical motions are properly controlled and the door is not allowed to do vertical motions when not fully extended horizontally, nor allowed to do horizontal motions when vertical motions have begun because vehicle damage might result. Plate 42 has one or more slots allowing proper adjustment of the ball and groove locking mechanism for correct fit of the door into the door frame. By this means the bi-directional hinge has a first position corresponding to the door being closed, a second position corresponding to the door having opened through the horizontal plane, a vertical shaft having at least one steel ball 38 disposed therein and a groove 39. The groove 39 is located beneath the vertical shaft when the bi-directional hinge is in the first position and the ball 38 is sitting partially in the groove 39 and blocking rotation of the bi-directional hinge when the bi-directional hinge is in the first position. The natural result is that the ball 38 is forced out of the groove 39 when the bi-directional hinge is in the second position, and this enables rotation of the bi-directional hinge in the vertical plane.

Advantageously, a gas cylinder, electrical actuator, hydraulic actuator, or spring as discussed above with reference to the first embodiment may also be employed. This is useful in counteracting the weight of the car door, which is of concern in any vertical opening door system.

Figure 7:
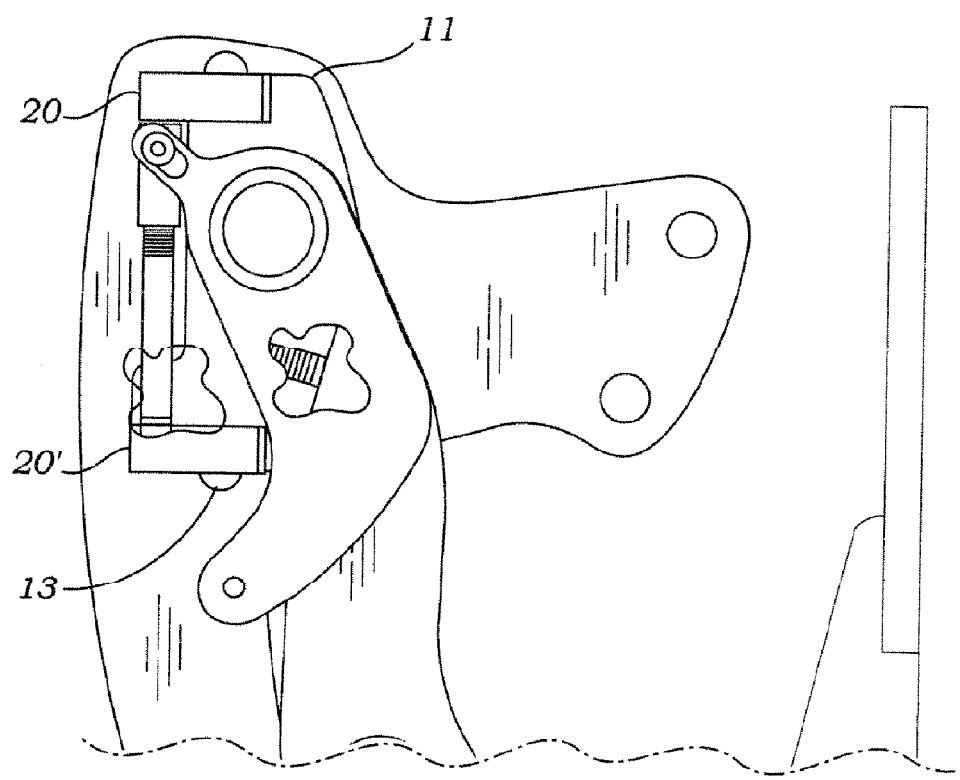
FIG. 7 is a side view with two partial cut-aways.
Figure 8:
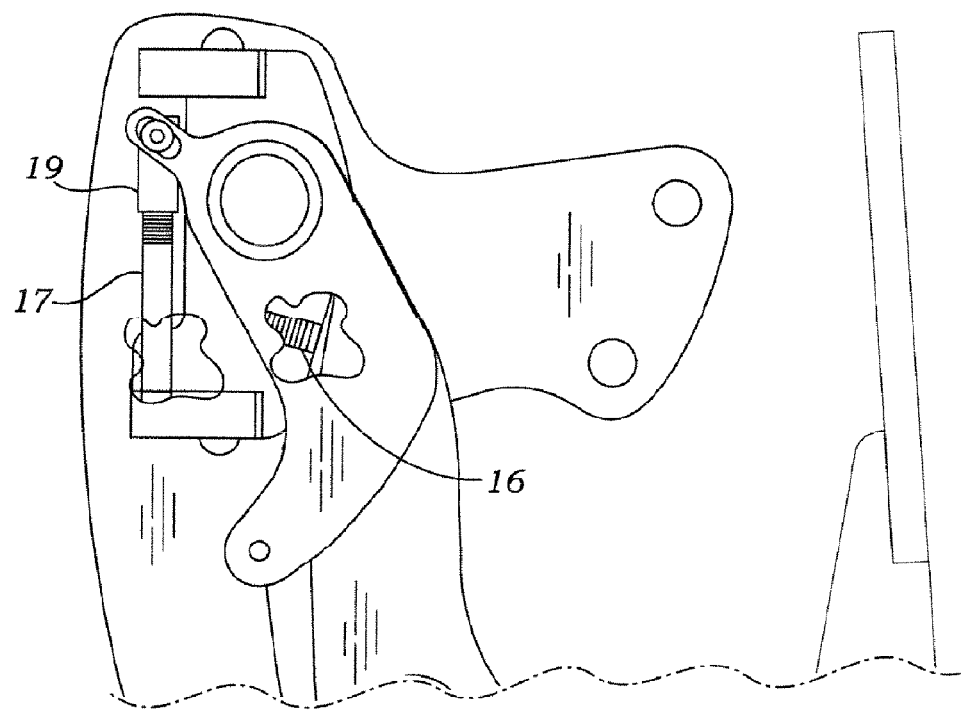
FIG. 8 is a side view with two partial cut-aways.
Figure 9:
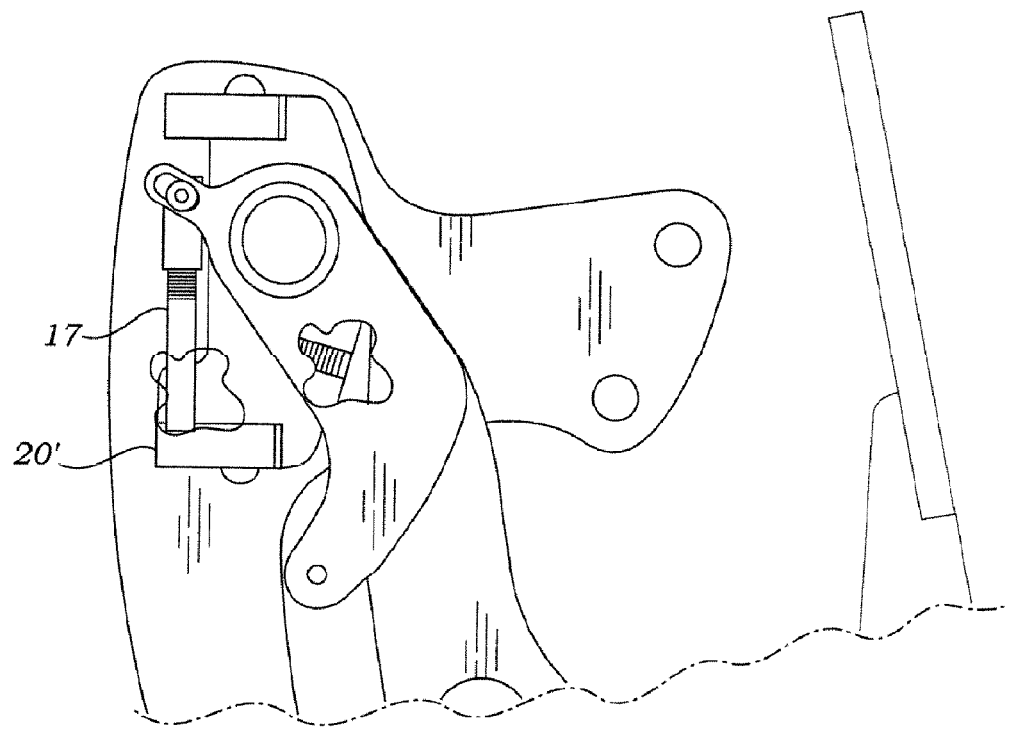
FIG. 9 is a side view with two partial cut-aways, showing the swingarm of the third embodiment as it begins its vertical arc motion.

FIG. 7 is a side view with two partial cut-aways; FIG. 7 shows a vehicle door hinge according to a third embodiment of the invention at rest. Bidirectional hinge 11 and hinge supports 20 and 20' function as previously described with reference to the second embodiment: hinge 11 rotates "out of the plane" of FIG. 7, during the course of which motion it may reach the position shown in FIG. 8. FIG. 8 is a side view with two partial cut-aways; FIG. 8 shows the third embodiment of the invention either in the course of the horizontal motion or may also be considered to show the third embodiment at rest, with the door properly adjusted by means of adjuster screw 16. FIG. 9 is a side view with two partial cut-aways, showing the swingarm of the third embodiment as it begins its vertical arc motion. Adjuster screw 16 no longer bears any weight as swingarm 18 is no longer bearing upon adjuster screw 16 due to the counter-clockwise rotation of the swingarm visible in FIG. 9.

Locking pin 17 sits inside of sleeve 19, sleeve 19 is internally threaded while pin 17 is externally threaded to allow mutual engagement and adjustment after the door is properly and correctly fit to the frame/chassis. This adjustment moves pin 17 downwards until it pushes against hinge support 20'. Pin 17 and hinge support 20' are dimensioned and configured and engaged so that pin 17 must align properly with hinge support 20' in the horizontal plane before any vertical plane motion is permitted. When the two are properly aligned the swingarm is able to undergo vertical motion, as pin 17 may enter and/or pass through hinge support 20'. By this device, the swingarm is constrained to move in a horizontal arc before any vertical motion is allowed.

Figure 10:
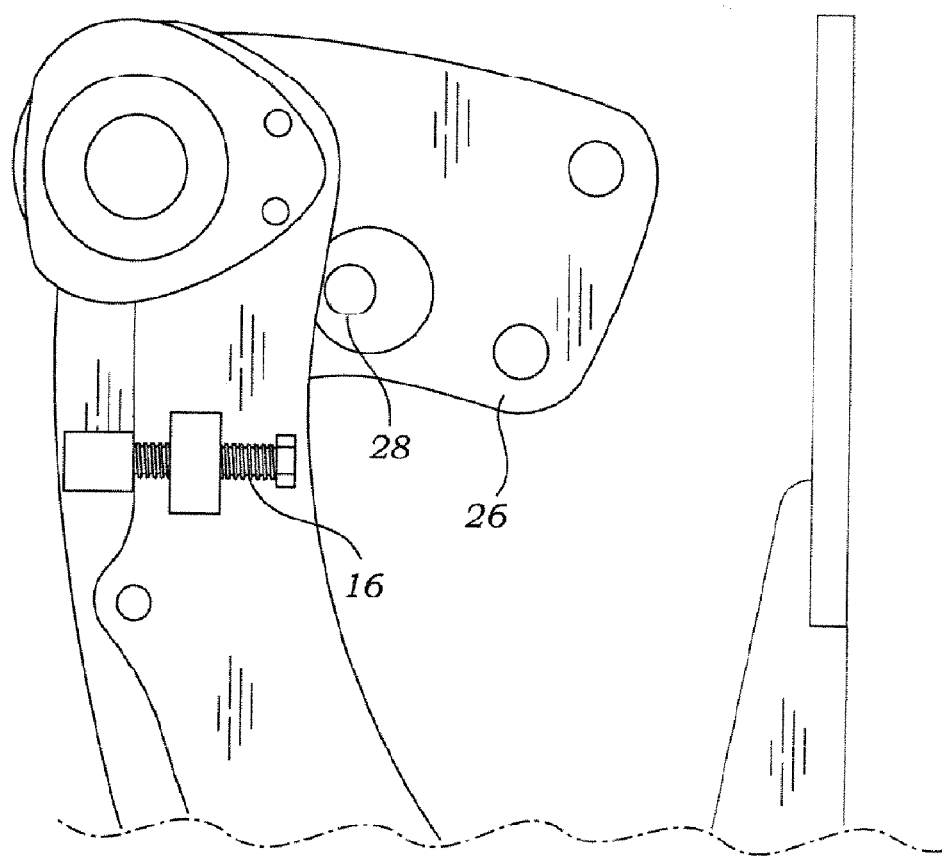
FIG. 10 is a side view with two partial cut-aways.
Figure 11:
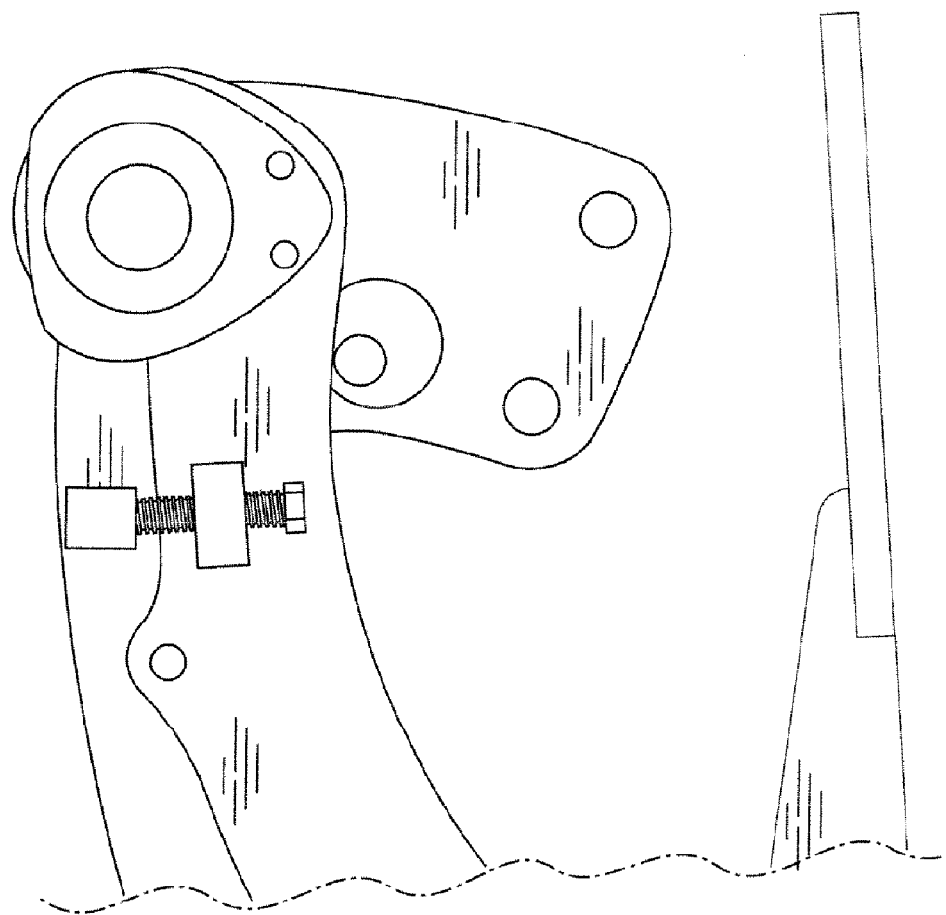
FIG. 11 is a side view with two partial cut-aways.

FIG. 10 is a side view with two partial cut-aways; FIG. 10 shows a fourth embodiment of the invention at rest. Adjuster screw 16 is as previously discussed, though in this case adjuster screw 16 is carried by the swingarm. Spherical bearing 11 is as, previously described. In this embodiment, chassis mounting plate 26 carries adjustable rotating stud lock 28 rather than the devices discussed in previous embodiments. Stud lock 28 is a disc with external threads and an off-center protruding stud. The stud rotates into position so that it does not allow the swingarm to go into its vertical arc of motion prior to completion of the horizontal arc. In addition, these various devices prevent horizontal arc motion during the time of vertical arc motion: this is important as it prevents the door from banging horizontally against the frame of the vehicle when extended vertically. Thus for closing of the door, only vertically downward motion is permitted until the vertical stop is reached, then horizontal motion may seat the door into the frame. FIG. 11 shows a side view with two partial cut-aways; FIG. 11 shows the fourth embodiment of the invention at rest, with the door properly adjusted: comparison of FIG. 11 and FIG. 10 will reveal the difference between the adjusted state (with the door seating into the correct fit) and the unadjusted state (during installation, for example).

Figure 12:
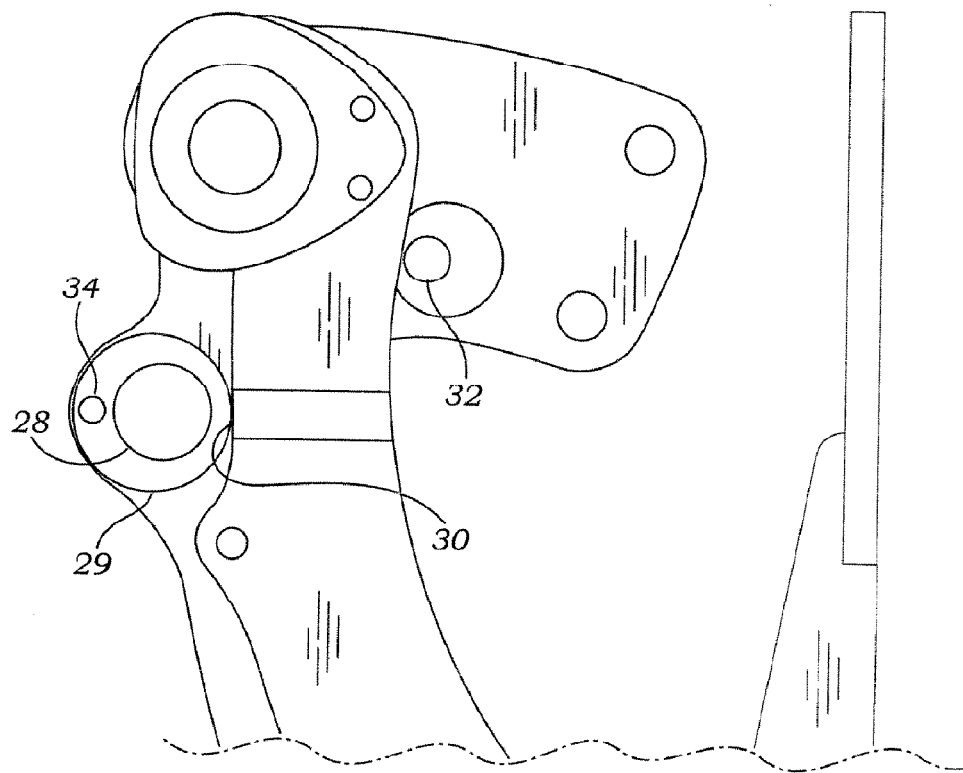
FIG. 12 is a side view with two partial cut-aways.
Figure 13:
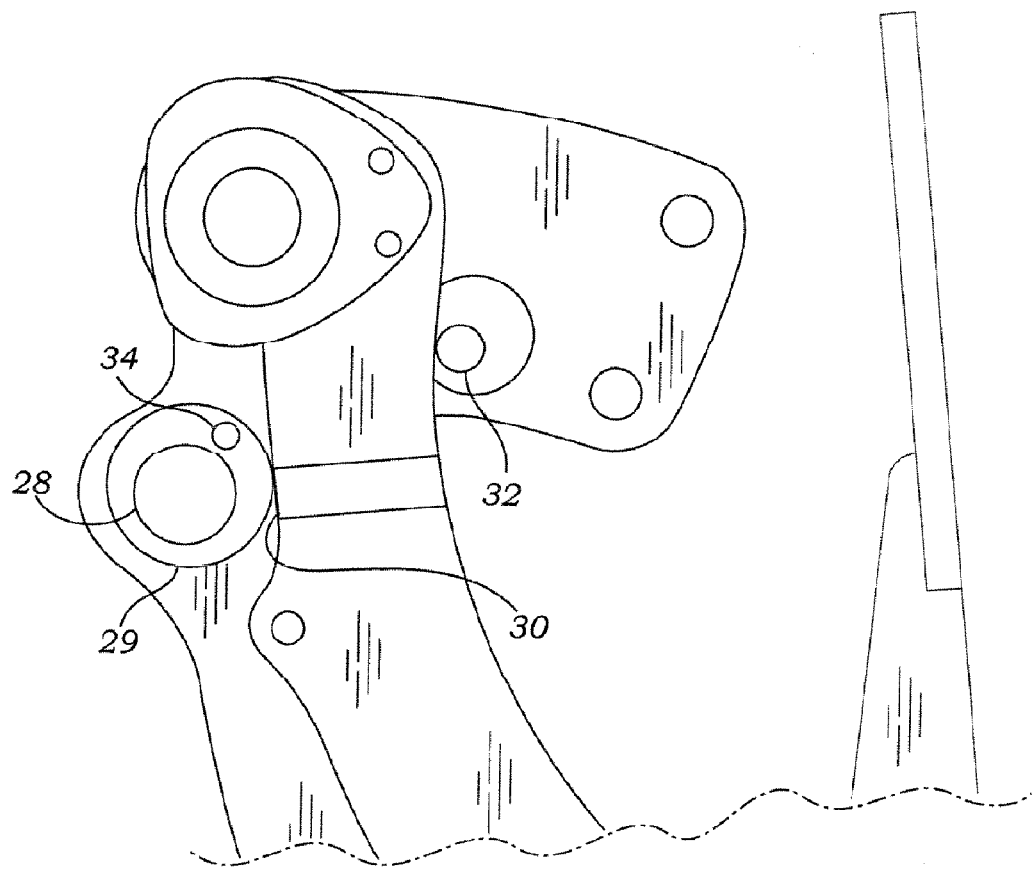
FIG. 13 is a side view with two partial cut-aways.

FIG. 12 is a side view with two partial cut-aways; FIG. 12 shows a fifth embodiment of the invention at rest. FIG. 13 is a side view with two partial cut-aways; FIG. 13 shows the fifth embodiment of the invention at rest, with the door properly adjusted. These diagrams correspond to the figures previously discussed, however, this embodiment features both a cam adjuster 28 with an offset barrel 29 borne upon by horizontal bearing surface 30 and an adjustable rotating stud lock 32. Note that cam adjuster 28 is equipped with set screw 34 to aid in maintaining proper adjustment: as with set screws in various embodiments of the invention, set screw 34 has a first position in which rotation of the barrel about the post is enabled and a second position in which rotation about the post is disabled/prevented. As in previous embodiments, the horizontal motion ("out of the plane" of FIGS. 12 and 13) causes surface 30 to bear on barrel 29, while stud lock 32 prevents any premature vertical motion. When the swingarm clears stud lock 32, vertical swingarm motion (counter-clockwise as sensed in FIGS. 12 and 13) commences.

Figure 15:
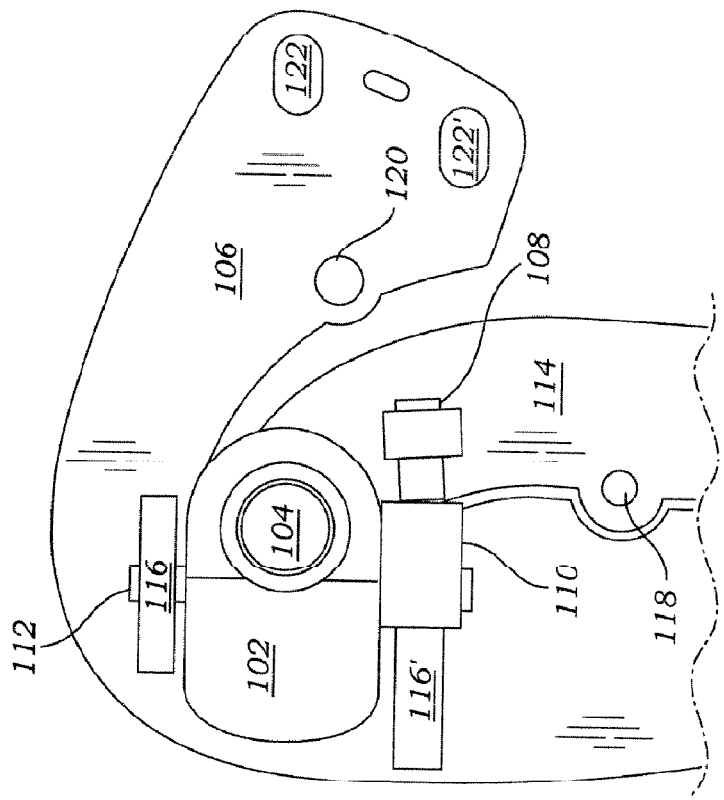
FIG. 15 is a side view of the sixth embodiment of the invention prior to adjustment.
Figure 14:
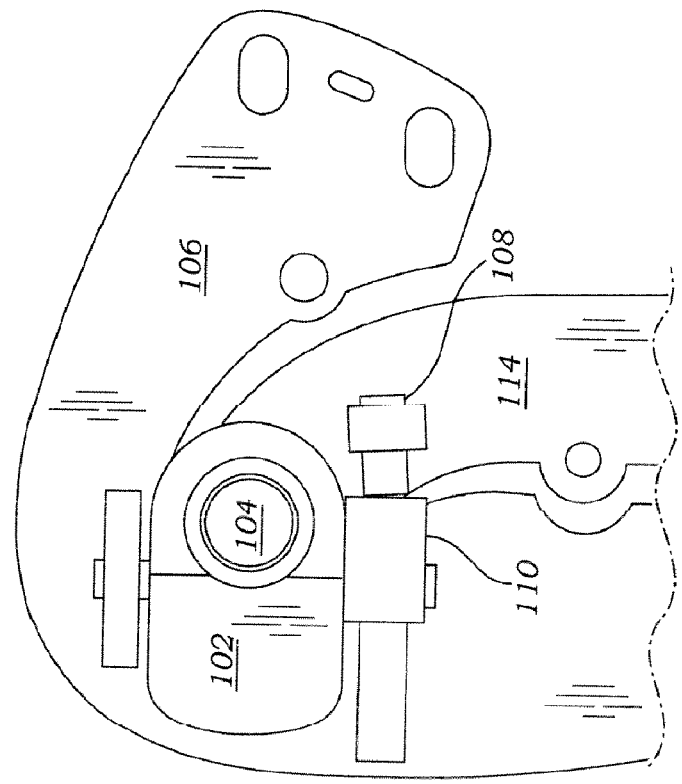
FIG. 14 is a side view of a sixth embodiment of the invention properly adjusted.

FIG. 14 is a side view of a sixth embodiment of the invention properly adjusted, FIG. 15 is a side view of the sixth embodiment of the invention prior to adjustment. FIG. 14 shows the embodiment at rest, after adjustment, while FIG. 15 shows the sixth embodiment after adjustment of sag adjuster screw (set screw) 108. The sixth embodiment has bi-hinge 102, bi-hinge rod 104, chassis plate 106, swingarm 114, sag adjuster screw 108, sag adjuster guide 110, bi-hinge pin(s) 112, bi-hinge supports 116, 116', upper spring mount 118, pin 120, and mount holes 122, 122'.

In this embodiment, horizontal alignment is maintained throughout the first horizontal arc/plane by means of sag adjuster screw 108 and sag adjuster guide 110. As the vehicle door opens during the horizontal phase of the motion, sag adjuster guide 110 will rotate with bi-hinge 102 (rotationally connected in the first horizontal plane), maintaining a continuous state of contact (bearing against) with sag adjuster screw 108. Sag adjuster screw 108 and sag adjuster guide 110 will take the weight and torque of the vehicle door (not pictured) to which swingarm 114 is attached. By taking this burden, as with other embodiments previously discussed, the life of the hinge mechanism is prolonged, the accurate fit of the door to the vehicle is maintained, and opening and closing of the door is eased.

Accurate fit of the door of the vehicle to the door frame is particularly important. At the far end of the door (not pictured) some combination of latch and striker must meet in exact engagement. Without such precise engagement, the door may rattle, fail to close or open, allow air to "whistle", allow air to enter or depart the vehicle, wear excessively, break, or suffer other adverse consequences. In addition, the entire door periphery and frame should be in exact alignment as well for substantially the same reasons.

In general, the various embodiments may have "swingarm angle adjusters" by which term the applicant refers to the devices having bearing surfaces, studs, pins, posts, etc which allow easy adjustment of the door for proper fit and also control the motions of the door: allowing only horizontal motion during the horizontal arc of initial opening and only vertical motion during the vertical arc when the horizontal opening arc has been completed. The swingarm angle adjusters of all types act in the reverse manner during the closing operations.

Also in general, embodiments of the invention may have set screws or other sag adjustment devices allowing a precision alignment of the vehicle door to the vehicle frame, for the numerous reasons previously stated. In particular, such sag adjustment devices should bear the weight and torque of the door under the influence of gravity during the horizontal portion of the opening/closing cycle.

One preferred embodiment of the present invention is as a retrofit kit. In general, only a few models of extremely expensive cars have doors which open vertically at the present time, despite the numerous advantages (alluded to earlier) of vertical arc doors. The present invention may in one alternative embodiment be factory installed, however in another embodiment, it may be easily retrofitted to existing vehicles doors, thus offering the convenience of vertical rotation doors to vehicles already in use.

In embodiments, the retrofit kit may be used with the 1996–2000 model year of HONDA 2 and 3 door CIVIC, the ACURA INTEGRA and ACURA RSX, MITSUBISHI ECLIPSE, TOYOTA CELICA and TOYOTA MR2 SPIDER. (Trademarks of the indicated automobile corporations, not associated with the applicant.) In other embodiments, the retrofit kit may be employed with an extremely wide range of additional automobile makes and models.

In the retrofit operation, the user will remove the conventional door hinges. The invention may be installed either as a hole-for-hole replacement of the older equipment, or the user may drill new holes or weld as needed to accommodate the door mounting plate portion of the swingarm and the chassis mounting plate of the invention. The chassis mounting plate may be fastened securely to the vehicle frame, the swingarm may be securely fastened to the vehicle door, and the bi-directional rotation mechanism connecting them installed. The spring or strut may be installed next. Next, the user will carefully manipulate the mechanism to determine the extent of the play present when the door is closed and adjust the cam adjuster to provide a tight and correct fit when closed. Finally, the user will carefully determine what horizontal angle of rotation is necessary to provide clearance from all other parts of the automobile during the opening cycle and what vertical angle of rotation is desirable for minimum obstruction of the user.

The present invention may be embodied into all types of vehicles especially including automobiles, trucks and vans, but further including buses, agricultural equipment, aerial vehicles, boats and other types of vehicles having enclosed compartments.

This disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood only from the following claims.

The invention claim is:

1. A method of opening a vehicle door in a doorway of a vehicle body, the method comprising:
    rotating the vehicle door in a horizontal plane of motion until the vehicle door substantially clears the vehicle body; and
    then rotating the vehicle door in a vertical plane of motion until the vehicle door substantially clears the doorway.

2. The method of claim 1, further comprising installing a hinge between the vehicle door and a vehicle frame of the vehicle, the hinge comprising a chassis mounting plate, a swingarm, and a bi-directional rotation mechanism and a sag adjustment device coupled to at least one of the chassis mounting plate and the swingarm, the installing step comprising:
    fastening the chassis mounting plate to the vehicle frame, the chassis mounting plate comprising a first portion of the sag adjustment device;
    fastening the swingarm to the vehicle door, the swingarm comprising a second portion of the sag adjustment device, the bi-directional rotation mechanism allowing motion of the door in the horizontal plane and the vertical plane.

3. The method of claim 2, including the step of preventing motion of the door in the vertical plane when the door is rotated in the horizontal plane until the swingarm clears a stopping pin on the chassis mounting plate.

4. The method of claim 2, wherein the first portion of the sag adjustment device comprises a sag adjuster screw and the second portion of the sag adjustment device comprises a sag adjuster guide, the method including bearing the screw against the sag adjuster device during rotation of the vehicle door in the horizontal plane of motion.

5. The method of claim 4, further comprising adjusting the sag adjuster screw to fit the vehicle door to the doorway when the vehicle door is closed.

6. The method of claim 2, wherein rotating the vehicle door in the horizontal plane of motion comprises preventing vertical motion of the vehicle door until the swingarm clears a stopping pin on the chassis mounting plate.

7. The method of claim 2, further comprising fastening opposite ends of a spring to the chassis mounting plate and the swingarm, respectively, to at least partially counter balance the weight of the vehicle door.

8. The method of claim 2, wherein the bi-directional rotation mechanism comprises a bi-hinge connected to the chassis mounting plate by bi-hinge supports, thereby allowing the vehicle door to rotate in the horizontal plane, and a bi-hinge rod connected to the swingarm and the bi-hinge, thereby allowing the vehicle door to rotate in the vertical plane.

9. A method for retrofitting a vehicle door hinge connecting a vehicle door to a vehicle frame, comprising:
  removing the vehicle door hinge;
  fastening a chassis mounting plate to the vehicle frame; and
  fastening a swingarm to the vehicle door, the swingarm being connected to the chassis mounting plate by a bi-directional rotation mechanism that allows the vehicle door to rotate in a horizontal plane and in a vertical plane relative to the vehicle frame.

10. The method of claim 9, further comprising at least partially counter balancing the weight of the vehicle door by fastening opposite ends of a spring to the chassis mounting plate and swingarm, respectively.

11. The method of claim 10, wherein each of the chassis mounting plate and swingarm includes a spring mounting hole and wherein the step of fastening opposite ends of the spring comprises fastening the opposite ends of the spring to respective spring mounting holes in the chassis mounting plate and swingarm.

12. The method of claim 9, further comprising at least partially counterbalancing the weight of the vehicle door with at least one of a hydraulic actuator and an electrical actuator.

13. The method of claim 9, further comprising adjusting a sag adjustment device on at least one of the chassis mounting plate and the swingarm to adjust the vehicle door such that the vehicle door fits with the vehicle frame when the vehicle door is closed.

14. The method of claim 13, wherein the sag adjustment device comprises a sag adjuster screw on one of the chassis mounting plate and the swingarm and a sag adjuster guide on the other of the chassis mounting plate and the swingarm, the adjusting step comprising adjusting the sag adjuster screw.

15. The method of claim 9, wherein the bi-directional rotation mechanism comprises a bi-hinge connected to the chassis mounting plate by bi-hinge supports, thereby allowing the vehicle door to rotate in the horizontal plane, and a bi-hinge rod connected to the swingarm and the bi-hinge, thereby allowing the vehicle door to rotate in the vertical plane.

16. A method for installing a hinge between a vehicle frame and a vehicle door, the hinge comprising a chassis mounting plate, a swingarm, a bi-directional rotation mechanism connecting the swingarm to the chassis mounting plate, and a swingarm angle adjuster, the method comprising:
  fastening the chassis mounting plate to the vehicle frame;
  fastening the swingarm to the vehicle door, the bi-directional rotation mechanism allowing rotation of the vehicle door in a horizontal plane and a vertical plane relative to the vehicle frame; and
  adjusting the swingarm angle adjuster to adjust an angle of the vehicle door relative to the vehicle frame that is maintained during rotation of the vehicle door in the horizontal plane.

17. The method of claim 16, further comprising removing a previous hinge from between the vehicle frame and the vehicle door.

18. The method of claim 16, further comprising at least partially counter balancing the weight of the vehicle door by fastening opposite ends of a spring to the chassis mounting plate and swingarm, respectively.

19. The method of claim 16 further comprising at least partially counter balancing the weight of the vehicle door with at least one of a coil spring, a gas strut, a hydraulic cylinder, a gas cylinder, and an electrical actuator.

20. The method of claim 16, wherein the bi-directional rotation mechanism comprises a bi-hinge connected to the chassis mounting plate by bi-hinge supports, thereby allowing the vehicle door to rotate in the horizontal plane, and a bi-hinge rod connected to the swingarm and the bi-hinge, thereby allowing the vehicle door to rotate in the vertical plane.

21. The method of claim 16, wherein the swingarm angle adjuster comprises a sag adjuster screw on one of the chassis mounting plate and the swingarm and a sag adjuster guide on the other of the chassis mounting plate and the swingarm, the adjusting step comprising adjusting the sag adjuster screw.

22. A method for installing a hinge between a vehicle frame and a vehicle door, the hinge comprising a chassis mounting plate, a swingarm, and a bi-directional rotation mechanism connecting the swingarm to the chassis mounting plate, the method comprising:
  fastening the chassis mounting pie to the vehicle frame;
  fastening the swingarm to the vehicle door, the bi-directional rotation mechanism allowing motion of the vehicle door in a horizontal plane and in a vertical plane relative to the vehicle frame; and
  fastening opposite ends of a spring to the chassis mounting plate and the swingarm, respectively, to at least partially counter balance the weight of the door.

23. The method of claim 22, further comprising removing a previous hinge from between the vehicle frame and the vehicle door.

24. The method of claim 22, wherein the hinge further comprises a swingarm angle adjuster, the method further comprising adjusting the swingarm angle adjuster to adjust an angle of the vehicle door relative to the vehicle frame that is maintained during motion of the vehicle door in the horizontal plane.

25. The method of claim 24, wherein the swingarm angle adjuster comprises a sag adjuster screw on one of the chassis mounting plate and the swingarm and a sag adjuster guide on the other of the chassis mounting plate and the swingarm, the adjusting step comprising adjusting the sag adjuster screw.

26. The method of claim 25, wherein the sag adjuster guide comprises a sag adjuster screw guide mechanism rotationally connected in the horizontal plane to the bi-directional rotation mechanism.

* * * * *

UNITED STATES PATENT AND TRADEMARK OFFICE
CERTIFICATE OF CORRECTION

PATENT NO. : 7,059,655 B2 Page 1 of 1
APPLICATION NO. : 10/722235
DATED : June 13, 2006
INVENTOR(S) : Demetrius Calvin Ham It is certified that error appears in the above-identified patent and that said Letters Patent is hereby corrected as shown below:

Column 14
Line 47, delete "pie" and insert --plate--

Signed and Sealed this

Seventeenth Day of October, 2006

JON W. DUDAS
*Director of the United States Patent and Trademark Office*